(12) United States Patent
Zhang et al.

(10) Patent No.: US 12,117,307 B2
(45) Date of Patent: **\*Oct. 15, 2024**

(54) INTERACTIVE 3D POINT CLOUD MATCHING

(71) Applicant: Beijing Didi Infinity Technology and Development Co., Ltd., Beijing (CN)

(72) Inventors: Yan Zhang, Sunnyvale, CA (US); Tingbo Hou, Santa Clara, CA (US)

(73) Assignee: Beijing Didi Infinity Technology and Development Co., Ltd., Beijing (CN)

( * ) Notice: Subject to any disclaimer, the term of this patent is extended or adjusted under 35 U.S.C. 154(b) by 768 days.

This patent is subject to a terminal disclaimer.

(21) Appl. No.: 17/208,769

(22) Filed: Mar. 22, 2021

(65) Prior Publication Data

US 2021/0270628 A1    Sep. 2, 2021

Related U.S. Application Data

(63) Continuation of application No. 16/235,985, filed on Dec. 28, 2018, now Pat. No. 10,955,257.

(51) Int. Cl.
*G01C 21/36* (2006.01)
*G01S 17/89* (2020.01)
*G06F 3/04815* (2022.01)

(52) U.S. Cl.
CPC ..... *G01C 21/3638* (2013.01); *G01C 21/3614* (2013.01); *G01S 17/89* (2013.01); *G06F 3/04815* (2013.01)

(58) Field of Classification Search
CPC ........... G01C 21/3638; G01C 21/3614; G01C 21/3841; G01S 17/89; G06F 3/04815;

(Continued)

(56) References Cited

U.S. PATENT DOCUMENTS

| 10,489,965 B1 | 11/2019 | Cregan et al. |
| 10,955,257 B2 | 3/2021 | Zhang et al. |

(Continued)

FOREIGN PATENT DOCUMENTS

| CN | 103106680 A | 5/2013 |
| CN | 108286976 | 7/2018 |

(Continued)

OTHER PUBLICATIONS

International Search Report and Written Opinion—PCT/US2018/067892—Mailed Apr. 24, 2019.

(Continued)

*Primary Examiner* — Frederick M Brushaber
(74) *Attorney, Agent, or Firm* — Knobbe, Martens, Olson and Bear, LLP

(57) ABSTRACT

Systems and methods are disclosed related to generating an interactive user interface that enables a user to move, rotate or otherwise edit 3D point cloud data in virtual 3D space to align or match point clouds captured from LiDAR scans prior to generation of a high definition map. A system may obtain point cloud data for two or more point clouds, render the point clouds for display in a user interface, then receive a user selection of one of the point clouds and commands from the user to move and/or rotate the selected point cloud. The system may adjust the displayed position of the selected point cloud relative to the other simultaneously displayed point cloud(s) in real time in response to the user commands, and store the adjusted point cloud position data for use in generating a new high definition map.

20 Claims, 11 Drawing Sheets

(58) Field of Classification Search
CPC ....... G06F 3/04845; G06F 2203/04803; G06F 2203/04806
See application file for complete search history.

(56) References Cited

U.S. PATENT DOCUMENTS

| | | | |
|---|---|---|---|
| 10,976,421 | B2 | 4/2021 | Zhang et al. |
| 2010/0204964 | A1 | 8/2010 | Pack et al. |
| 2013/0169685 | A1 | 7/2013 | Lynch |
| 2013/0207966 | A1* | 8/2013 | Chu .................. G06T 17/00 345/419 |
| 2014/0365934 | A1 | 12/2014 | Moore et al. |
| 2015/0012995 | A1 | 1/2015 | Korat et al. |
| 2015/0123995 | A1 | 5/2015 | Zavodny et al. |
| 2015/0323672 | A1 | 11/2015 | Shenkar et al. |
| 2016/0192154 | A1 | 6/2016 | Modica et al. |
| 2016/0196687 | A1 | 7/2016 | Alpert et al. |
| 2016/0379366 | A1 | 12/2016 | Shah et al. |
| 2017/0089710 | A1 | 3/2017 | Slusar |
| 2017/0234775 | A1 | 8/2017 | Finch et al. |
| 2017/0368755 | A1* | 12/2017 | Bader .................. B33Y 50/02 |
| 2018/0189578 | A1 | 7/2018 | Yang et al. |
| 2018/0306584 | A1 | 10/2018 | Merfels |
| 2019/0222736 | A1* | 7/2019 | Wheeler ................ G06T 7/80 |
| 2020/0209009 | A1* | 7/2020 | Zhang ............... G01C 21/3841 |
| 2020/0209370 | A1* | 7/2020 | Zhang ................. G01S 7/003 |

FOREIGN PATENT DOCUMENTS

| | | |
|---|---|---|
| CN | 108765487 A | 11/2018 |
| CN | 109064506 A | 12/2018 |

OTHER PUBLICATIONS

International Search Report and Written Opinion—PCT/US2018/067914—Mailed Apr. 24, 2019.
Li, Juan—Fusion of Lidar 3d Points Cloud With 2d Digital Camera Image—Sep. 25, 2015.
Ortega A. et al.—Calibration of an Outdoor Distributed Camera Network with a 3D Point Cloud—Jul. 29, 2014.
Tao, Zhipeng; Chen, Zhiguo; Wang, Ying; Wu, Bingbing; Cheng, Siqi, Research on real-time visualization of massive 3D terrain data CJFD Semantic Search, Semantic Basis: 2018801006764 Science and Technology Innovation and Application, issue 30, Oct. 28, 2013.
Ortega, et al. "Calibration of an outdoor distributed camera network with a 3D point cloud." Sensors 14.8 (2014): 13708-13729.
Li. "Fusion of LiDAR 3D points cloud with 2D digital camera image." Oakland University: Rochester, MI, USA (2015).

* cited by examiner

INTERACTIVE 3D POINT CLOUD MATCHING

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

This application is a continuation of U.S. patent application Ser. No. 16/235,985, entitled "INTERACTIVE 3D POINT CLOUD MATCHING," filed Dec. 28, 2018.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like. Providing an autonomous vehicle with accurate and precise high definition maps is one of the most fundamental and important prerequisites to enabling fully autonomous driving. For the sake of safety, autonomous vehicles require access to maps containing considerably more detailed information and true-ground-absolute accuracy than those found in typical existing map resources that were not designed for the purpose of autonomous driving.

DETAILED DESCRIPTION

Building a large-scale high definition map (HD map), such as an HD map of an entire city, is a relatively new technical field. One of the challenges is the very large amount of captured data that must be processed and explored (typically programmatically) through a multi-part map building pipeline. Despite final outputs of 3D dense point clouds and 2D map images, there are also intermediate results in the typical HD map-building process, such as light detection and ranging (LiDAR) scans and corresponding pose graphs. Existing approaches to building HD maps generally lack efficient tools for enabling a user of a computing system to visually explore data in a specific area of captured LiDAR scan data, visualize intermediate and final results, and interactively make changes to intermediate data via graphical user interfaces to improve the quality of the ultimate HD map data. Aspects of the present disclosure include various user interface tools and associated computer functionality that enable integrated visual exploration and editing with respect to both two-dimensional (2D) and three-dimensional (3D) visualizations of captured LiDAR data, pose graphs, and map data in order to build more accurate HD maps.

Detailed descriptions and examples of systems and methods according to one or more illustrative embodiments of the present disclosure may be found in the section entitled Improved High Definition Map Generation Features and Associated Interfaces as well as in the section entitled Example Embodiments, and also in FIGS. 2-10 herein. Furthermore, components and functionality for the interactive user interfaces and associated HD map generation features may be configured and/or incorporated into the networked vehicle environment 100 described herein in FIGS. 1A and 1B.

Various embodiments described herein are intimately tied to, enabled by, and would not exist except for, vehicle and/or computer technology. For example, generating interactive graphical user interfaces for display and implementing associated computer functionality for manipulating potentially millions of points of data in 3D virtual space as described herein in reference to various embodiments cannot reasonably be performed by humans alone, without the vehicle and/or computer technology upon which they are implemented.

Networked Vehicle Environment

Figure 1A:
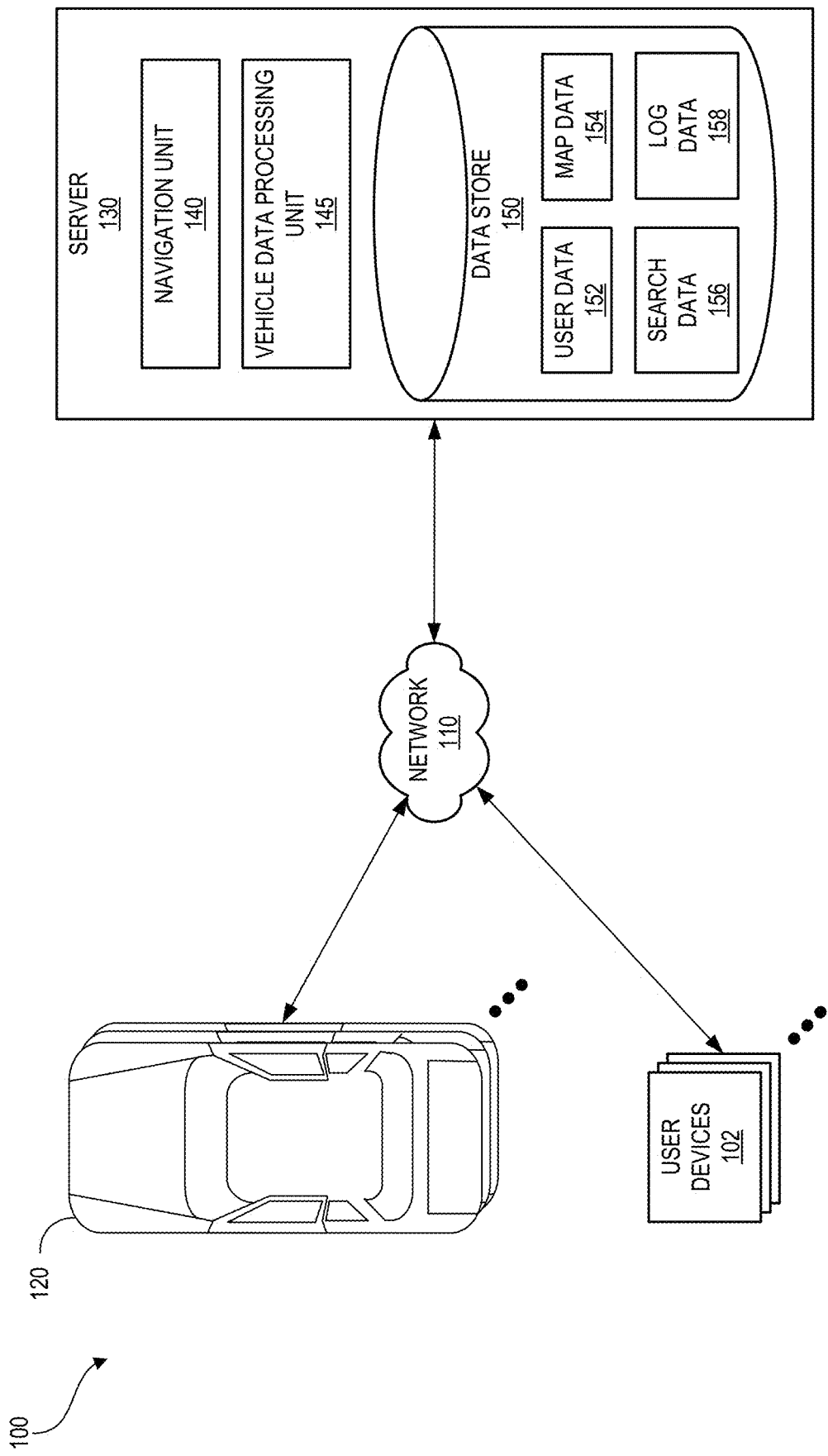
FIG. 1A illustrates a block diagram of a networked vehicle environment in which one or more vehicles and/or one or more user devices interact with a server via a network, according to one embodiment.

FIG. 1A illustrates a block diagram of a networked vehicle environment 100 in which one or more vehicles 120 and/or one or more user devices 102 interact with a server 130 via a network 110, according to one embodiment. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle).

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. In the embodiment, a user device 102 executes an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. In some embodiments, the server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
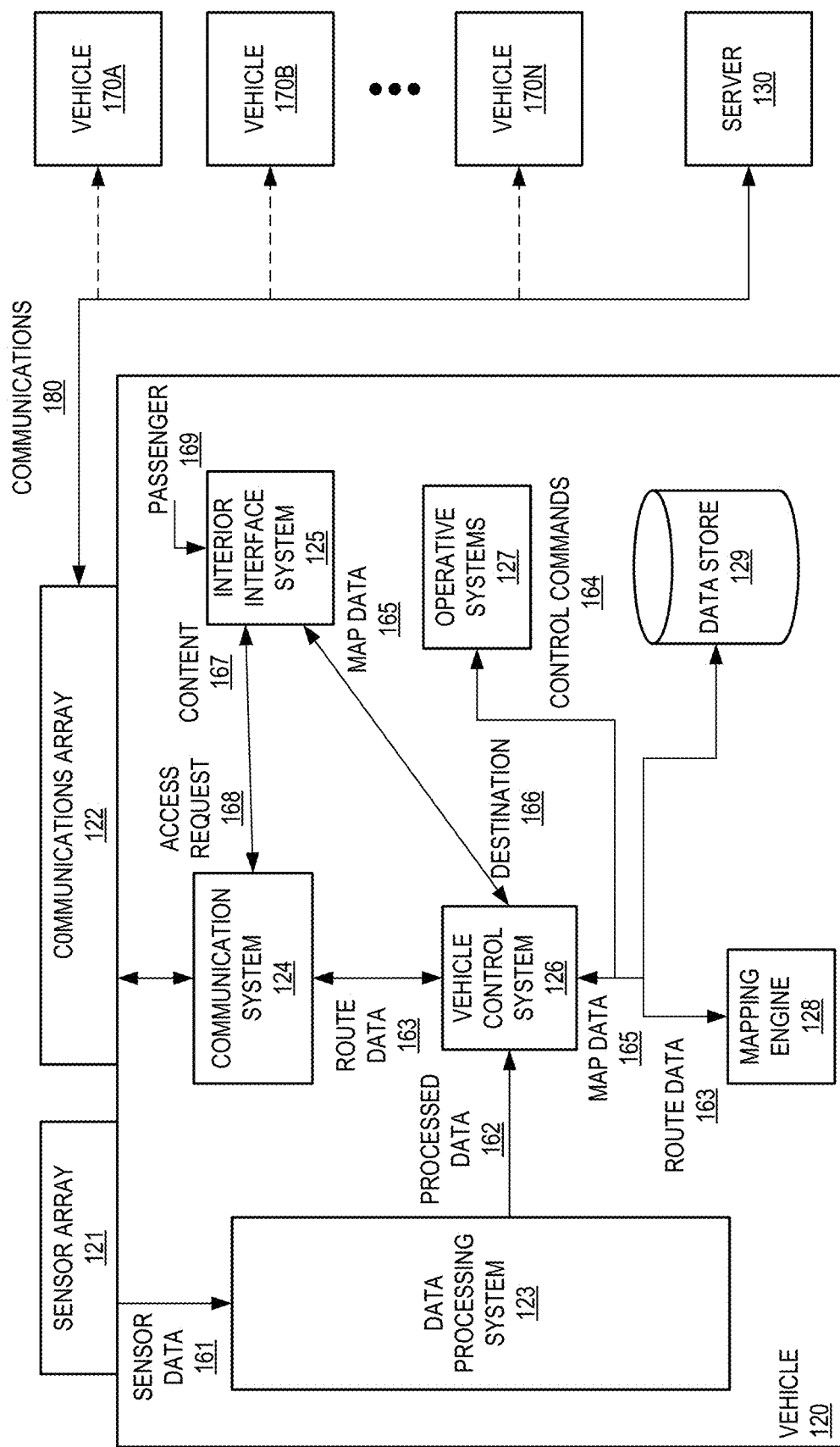
FIG. 1B illustrates a block diagram showing the vehicle of FIG. 1A in communication with one or more other vehicles and/or the server of FIG. 1A, according to one embodiment.

FIG. 1B illustrates a block diagram showing the vehicle 120 of FIG. 1A in communication with one or more other vehicles 170A-N and/or the server 130 of FIG. 1A, according to one embodiment. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. In some embodiments, the vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LIDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infra-red, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). In some embodiments, the vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Improved High Definition Map Generation Features and Associated Interfaces

Certain methods disclosed herein relate to generating interactive user interfaces that enable a user to alter 3D point cloud data and/or associated pose graph data generated from LiDAR scans prior to generation of an HD map. A user may make selections in a 2D map representation with overlaid graph node indicators in order to alter graph connections, remove nodes, view corresponding 3D point clouds, and otherwise edit intermediate results from LiDAR scans in order to improve the quality of an HD map subsequently generated from the user-manipulated data. The improved-quality HD map can be transmitted to one or more vehicles, such as vehicle(s) 120, to assist driver(s) in navigating, driving, and/or maneuvering the vehicle(s) 120, and/or for use in autonomously navigating, driving, and/or maneuvering the vehicle(s) 120.

According to some embodiments of the present disclosure, when vehicles (e.g., autonomous vehicles, vehicles used for location-based services, vehicles that provide driver-assist functionality, etc.) are driving on roads, 3D point cloud scans are collected from LiDAR sensors on top of the vehicles. These LiDAR scans from different regions may then be passed to an automated pipeline of data processing, including filtering, combining and matching of the various scans. HD maps can then be generated by the projection of these point clouds. Besides 3D point clouds and 2D map images, it is also beneficial to have tools for visualizing a pose graph and associated LiDAR scans so that an administrative user assisting with the mapping process can visually determine whether there are inconsistencies or inaccuracies remaining after various steps in the automated mapping pipeline.

Aspects of the present disclosure include, for example, user interfaces for viewing HD maps at different levels, exploring 3D point clouds of a certain part of an HD map, measuring the distance between two points from maps or point clouds, and tuning parts of a map to better align or match two or more point clouds. The user interfaces and associated functionality described herein may be used to improve the accuracy and efficiency of existing mapping methods.

As will be described further herein, aspects of the present disclosure include three related areas: map exploration, map editing, and map evaluation. When exploring maps in a user interface, a user may view a region of interest (ROI) within a 2D map view and select a portion in order to view corresponding 3D point clouds in a separate pane or viewing area of the user interface. When evaluating and editing maps in 2D and/or 3D views, a user can interactively make immediate changes to reduce or minimize unexpected inaccuracies resulting from a previously completed automatic mapping process.

The map exploration features described herein include loading one or more map graphs (which may take the form of a pose graph, in some embodiments) and presenting a visual representation of nodes and edges in the graph within a portion of a user interface that presents a 2D view of map data. Such a view within a user interface may enable a user to visually inspect a constructed pose graph, navigate between portions of the graph to explore associated 3D point clouds, and determine if any editing is needed to the graph based on a visual inspection. User interfaces described herein may enable a user to move and zoom within a 2D map view or 3D point cloud view. Graphs may be rendered at different zoom levels with different forms of graphical indicators depending on the zoom level. For example, at a zoomed out level, different sub-graphs may be abstracted as rectangles or polygons covering a wide area of a map, while zooming in may cause the user interface to update to display individual nodes and connections of the same sub-graphs, as will be further described herein.

Map exploration features described herein further include enabling a user to select one or more graph nodes in order to view their point clouds in a 3D rendered view. Point clouds from different nodes may be rendered in different colors within the same view, enabling a user to visually determine how neighboring point cloud align and identify any inaccuracies. The user may select to move, rotate and/or zoom in three dimensions when viewing point clouds. The user interfaces described herein may further enable the user to compare two different constructed graphs within a single 2D map view in order to compare any differences or misalignments. Additionally, a user interface may include background ruler grids and enable manual or automated real-world distance measurement between two points selected in either a 2D map view or a 3D point cloud view.

Map editing features described herein include enabling a user to delete edges from a graph, add edges to a graph and delete nodes from a graph. These changes may then affect which point cloud data is used to construct the final HD map, as well as how point cloud data associated with different LiDAR scans is combined in the HD map. Additionally, user interface features herein may enable the user to adjust the alignment or registration of two point clouds. For example, if the user identifies an area in the point cloud data where the map quality is not ideal due to misalignment or inaccurate positioning of one or more point clouds relative to another point cloud, the user may move the point cloud data to adjust the positioning relative to neighboring or redundant points from another LIDAR scan or capture.

Figure 2:
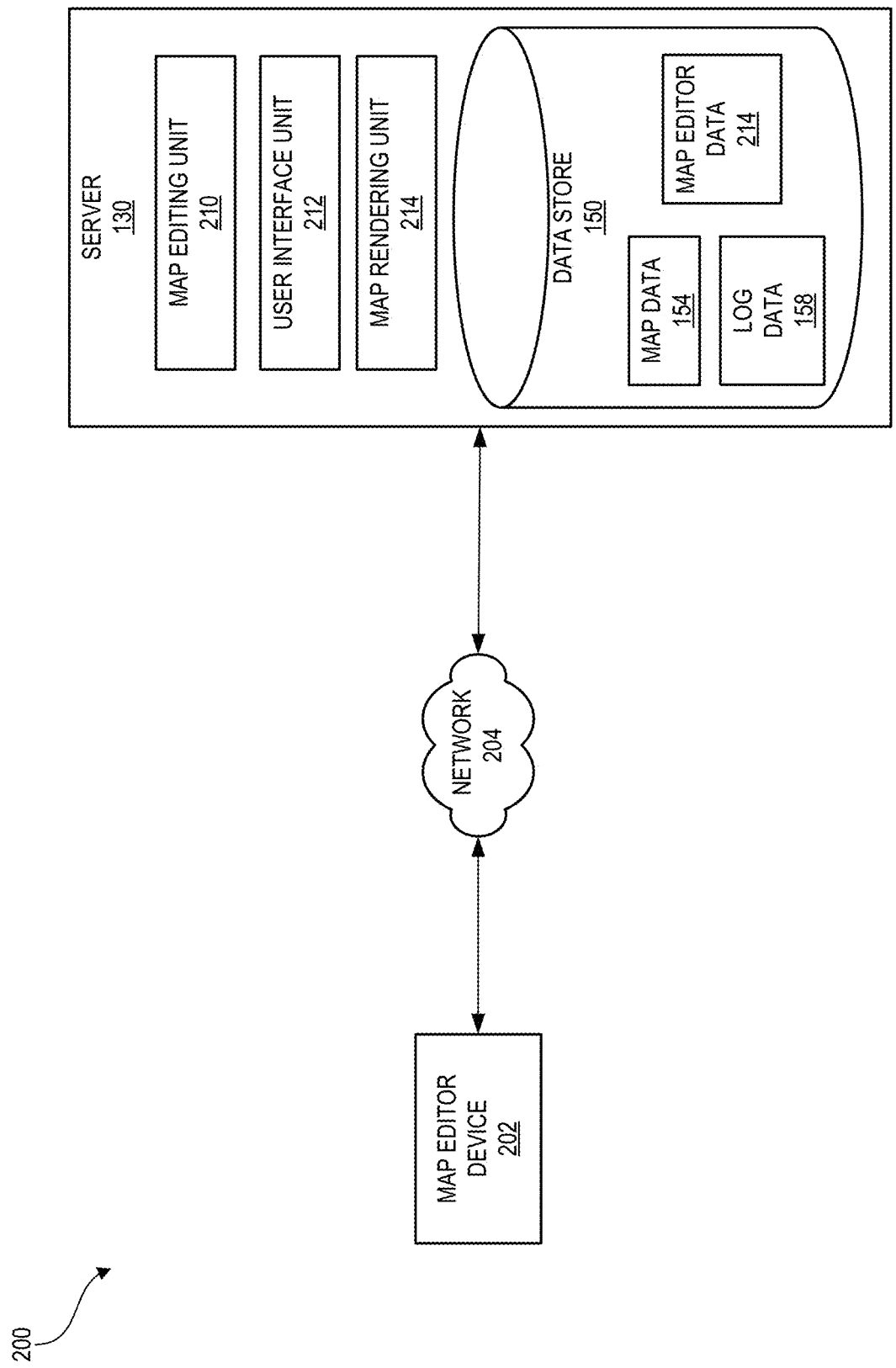
FIG. 2 illustrates a block diagram showing the server of FIGS. 1A and 1B in communication with a map editor device, according to one embodiment.

FIG. 2 illustrates a block diagram showing the server of FIGS. 1A and 1B in communication with a map editor device 202, according to one embodiment of a map editing environment 200. The map editor device 202 may be utilized by an administrative user in order to view, edit and improve intermediate data at various points in the HD map generation process. For example, as will be described below, a user of the map editor device 202 may access user interfaces that enable the user to view and edit point cloud data and associated pose graph data that may be stored in map data store 154 prior to the server 130 generating final HD map data for use by one or more vehicle 120. The map editor device 202 may communicate with the server 130 via the network 204, which may be any of the network types described above with respect to network 110. The network 204 may be the same network or a different network than network 110. For example, the network 204 may a local area network controlled by an operator of the server 130, in one embodiment.

As illustrated in FIG. 2, in addition to the components illustrated in FIG. 1A, the server 130 may include a map editing unit 210, user interface unit 212, map rendering unit 214, and map editor data 214. In the illustrated embodiment, the map editing unit 210 may generally be responsible for implementing changes to raw and intermediate HD map-related data through both programmatic approaches and in response to user-initiated requests from the map editor device 202. The user interface unit 212 may be responsible for generating for display (such as for display by the map editor device 202) various user interfaces that will be described herein, such as user interfaces for enabling a user of the map editor device 202 to visualize and manipulate point cloud data, pose graph data, as well as intermediate and final HD map data. The map rendering unit 214 may generate HD maps from intermediate results, such as point cloud data and pose graph data.

The stored map editor data 214 may include, for example, logs of changes made by a user of map editor device 202 to point cloud data and/or pose graph data, such that changes may be rolled back or undone. The map editor data 214 may further include, for example, information that is not needed for generating the HD maps themselves, but that facilitates visualization and editing by a user. For example, such data may include the colors assigned to various graphs for display in user interfaces, user preferences regarding keyboard shortcuts for graph or point cloud manipulation, 3D rendering or 2D projection preferences (e.g., default zoom levels, resolution, color schemes, zoom or rotation sensitivity, etc.), user-flagged portions or areas of a map for further review, and/or other data.

In some embodiments, the map editor device 202 may be a computing system, such as desktop or laptop computer or a mobile computing device (such as a smartphone or tablet device). The map editor device 202 may include or be in communication with a display device, such as a display monitor, a touchscreen display or other known display device. The map editor device 202 may further include or be in communication with user input devices, including but not limited to a mouse, keyboard, scroll device, touchscreen display, motion capture device, and/or stylus.

In one embodiment, the map editor device 202 may operate or execute an application (such as a browser or a custom-developed application) that receives a user interface generated by the server 130 (such as by the user interface unit 212), displays the user interface, and sends back responses, instructions or requests to the server 130 based on selections made by a user of the map editor device within the user interface. The server 130 may then make changes to data based on the user interactions and may send back an updated user interface for display by the map editor device. In another embodiment, the map editor device 202 may include a map editing unit, user interface unit and/or map rendering unit (for example, such units may be embodied within executable instructions of an application operated by the map editor device 202), such that the map editor device 202 does not need to communicate with the server 130 or any other system in order generate user interfaces to view and edit map data. For example, the map editor device 202 may load LiDAR data and/or intermediate data (such as pre-processed point cloud data and pose graphs) from the server 130, then might not communicate again with the server 130 until sending edited data or final HD map data back to the server 130 for storage in data store 150 and distribution to one or more vehicles 120. In other embodiments, various functionality may be implemented by either the server 130 or the map editor device 202 depending on, for example, the hardware capabilities of each system and network bandwidth considerations in a given instance.

Figure 3:
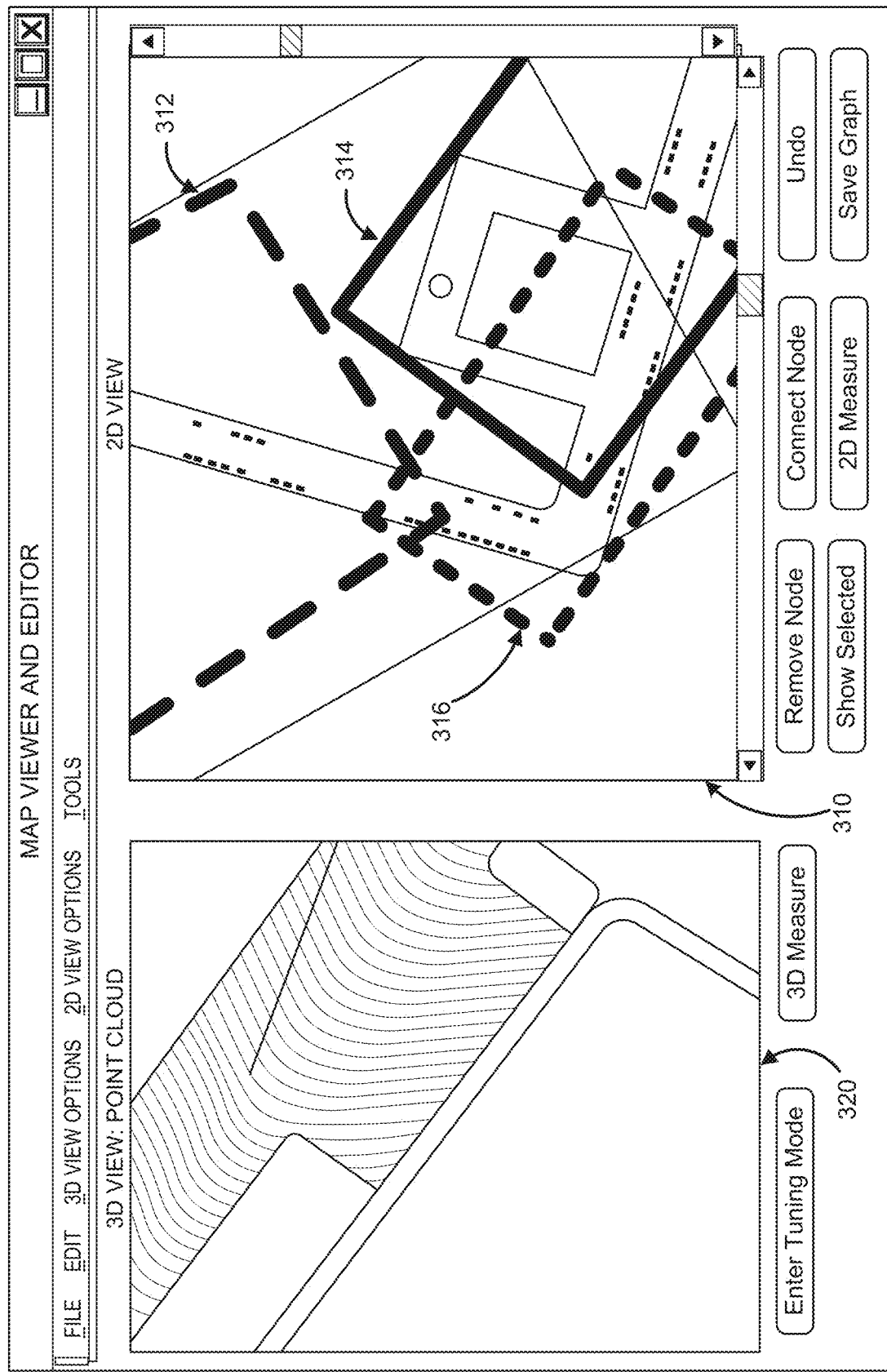
FIG. 3 is an illustrative user interface that includes a 3D point cloud rendering and a zoomed-out view of a 2D map projection, where the 2D map projection includes graphical indicators representing areas of different LiDAR scans.

FIG. 3 is an illustrative user interface 300 that includes a 3D point cloud rendering 320 and a zoomed-out view of a 2D map projection 310, where the 2D map projection 310 includes graphical indicators 312, 314 and 316 representing areas of different LiDAR scans. As mentioned above, each of the user interfaces that will be described with respect to FIGS. 3-10 herein (as well as the associated 3D rendering and/or 2D projection that may be included therein) may be generated by either the server 130 or the map editor device 202, depending on the embodiment, and may be presented for display by the map editor device.

Each of the areas marked by graphical indicators 312, 314 and 316 may represent, for example, hundreds or thousands of individual LiDAR scans, depending on a zoom level of the current view. In one embodiment, a vehicle with one or more LiDAR sensors may have been configured to capture, for example, a scan periodically (e.g., every millisecond, every 10 milliseconds, every 100 milliseconds, every second, etc.) while driving through streets represented in 2D map projection 310. The captured point cloud data of successive scans may thus partially overlap each other, and may have been matched and pre-processed by known automated methods in order to create intermediate point cloud results and pose graphs used to generate the 2D map projection 310 and 3D point cloud rendering 320. Such automated processes may have included, for example, an Iterative Closest Point (ICP) algorithm employed to minimize differences between neighboring point clouds and assign connections between point clouds represented by nodes in a pose graph based on matching scores. However, the automated processing methods may nevertheless have failed to create optimal point cloud alignments and/or pose graph data in some instances. The user interfaces described herein, including user interface 300, may enable a user to visually identify potential inconsistencies, errors, misalignments, poor quality captures, redundant data and/or other issued that remain after automated processing of the LiDAR data.

While graphical indicators 312, 314 and 316 are each represented as different rectangles having different dashing or solid lines to distinguish their appearance from each other, this formatting is for illustrative purposes only. The different dashed appearances may represent different colors, such that the actual user interface presented may have, for example, solid blue lines for indicator 312, solid red lines for indicator 314, and solid yellow lines for indicator 316. In some embodiments, the color selected for a given indicator may signify a relative determined quality of the scans therein, such that a red color indicates that an area may need attention from the user or potential edits. In other embodiments, the colors or patterns may not have any meaning other than serving to visually distinguish different groups of LiDAR scan data. The different groups may be, for example, scans captured at different times by the same vehicle, or scans captured by different vehicles. While the graphical indicators in user interface 300 are presented as rectangles, this is not intended to be limiting. In other embodiments, the graphical indicators may be other polygonal, circular or elliptical shapes, and may not have straight or smooth edges (e.g., may closely trace a scanned area, such that the shape roughly aligns with the shape of streets on which the LiDAR capturing vehicle drove).

The 2D map projections 310 may have been generated by the server or map editor device as a 2D overhead projection of LiDAR point cloud data captured from a vehicle on the ground. In other embodiments, the 2D map data may be based at least in part on images captured from a camera on the ground (such as on a vehicle), in the air or associated with satellite-captured imagery. A user may select points or regions in the 2D map projection 310 in order to view corresponding 3D point cloud data in the left portion of the user interface containing 3D point cloud rendering 320. The user may rotate, pan and zoom either the 2D or 3D view independently while the other view remains static. In other embodiments, the other view may automatically adjust to match panning, scrolling, selecting, rotating or zooming performed by the user in one view (e.g., scrolls in 2D representation 310 may automatically update which point cloud data is presented in 3D point cloud view 320). The user may zoom in or out in either the 2D or 3D view using keyboard shortcuts, a scroll wheel, touchscreen gestures or other manners. For example, in embodiments other than that illustrated, there may be buttons or other selectable options presented in the user interface 300 to enable scrolling, panning, rotating, selecting, and/or zooming in either view.

Figure 4:
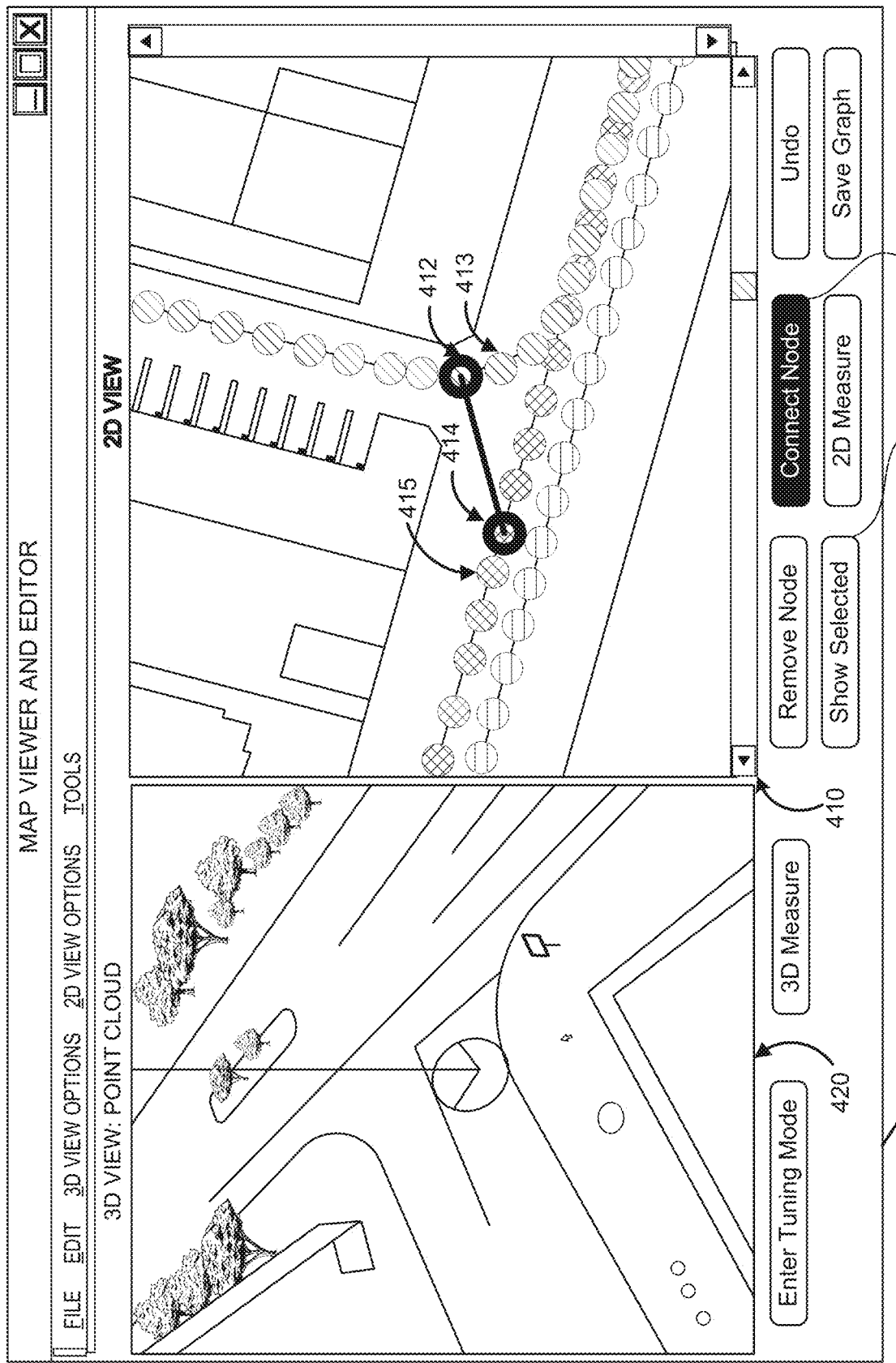
FIG. 4 is an illustrative user interface that includes a 3D point cloud rendering and a zoomed-in view of a 2D map projection, including overlaid graphical indicators of nodes and connections within pose graphs associated with point cloud data.

FIG. 4 is an illustrative user interface 400 that includes a 3D point cloud rendering 420 and a zoomed-in view of a 2D map projection 410, including overlaid graphical indicators of nodes and connections within pose graphs associated with point cloud data. The presented 2D map view 410 may have been displayed subsequent to a user requesting to zoom in relative to the prior presented 2D map view 310 discussed above with reference to FIG. 3. The user interface may be configured, for example, to switch between different styles of abstract representations or groupings of point cloud scans when a threshold zoom level is reached. For example, once zoomed in to a scale that meets a predefined threshold, the 2D map representation may alter its graphical overlay data to present nodes and corresponding connections (representing graph nodes and edges, respectively, in a pose graph) rather than higher-level abstractions or groupings such as rectangles or polygons defining regions.

Each of the displayed nodes (such as nodes 412-415) may represent multiple scans that have been grouped together during processing (such as using ICP) as a graphical node in a pose graph. For example, in one embodiment, each graphical node may represent twenty neighboring or partially overlapping LiDAR scans captured in close proximity to one another in succession (e.g., one each second). As illustrated, the nodes represented in 2D map representation 410 may have different appearances to represent that they are associated with different groups (e.g., captured at different times and/or by different sensors), different pose graphs, or different related subgraphs. Connections may be presented between different nodes in the same or different groupings to illustrate that there are partially overlapping point clouds between them and that there is sufficient matching confidence (e.g., determined via ICP, another automated process, and/or user input) to use them as neighboring groups in generating an HD map. While cross-hatching is used to illustrate different appearances and groupings of node indicators in the figures, it will be appreciated that these patterns may represent different colors in an actual user interface.

In the illustrated user interface 400, the user has selected the graphical indicators for node 414 and node 412, which are differently colored (shown by different cross-hatching or patterns in the figure) to illustrate that they are part of different groups and/or subgraphs. In response to selecting each node or by selecting the "show selected" option 434 once a node is selected, the 3D point cloud view 420 may have updated to display rendered point cloud data corresponding to the selected node(s). In a "color mode," which may be one 3D viewing option within the user interface, the 3D renderings in the 3D point cloud view 420 may be colored to match or correspond to the coloring of the respective nodes in the 2D view, or to otherwise visually signal which sets of point cloud data came from different sources or groups. Upon viewing the relative matching of point cloud data for node 414 and node 412 (such as sets of point clouds being rendered together simultaneously) in 3D point cloud view 420, the user may have decided that there was sufficient matching to add a new connection between nodes 414 and 412 via user selection of "connect node" option 430. The user may select to save this updated graph data in order to add a new edge between the nodes representing by graphical indicators 414 and 412 in stored pose graph data that will subsequently be used by the server 130 and/or the map editor device 202 to generate an HD map and/or to update an HD map.

Figure 5:
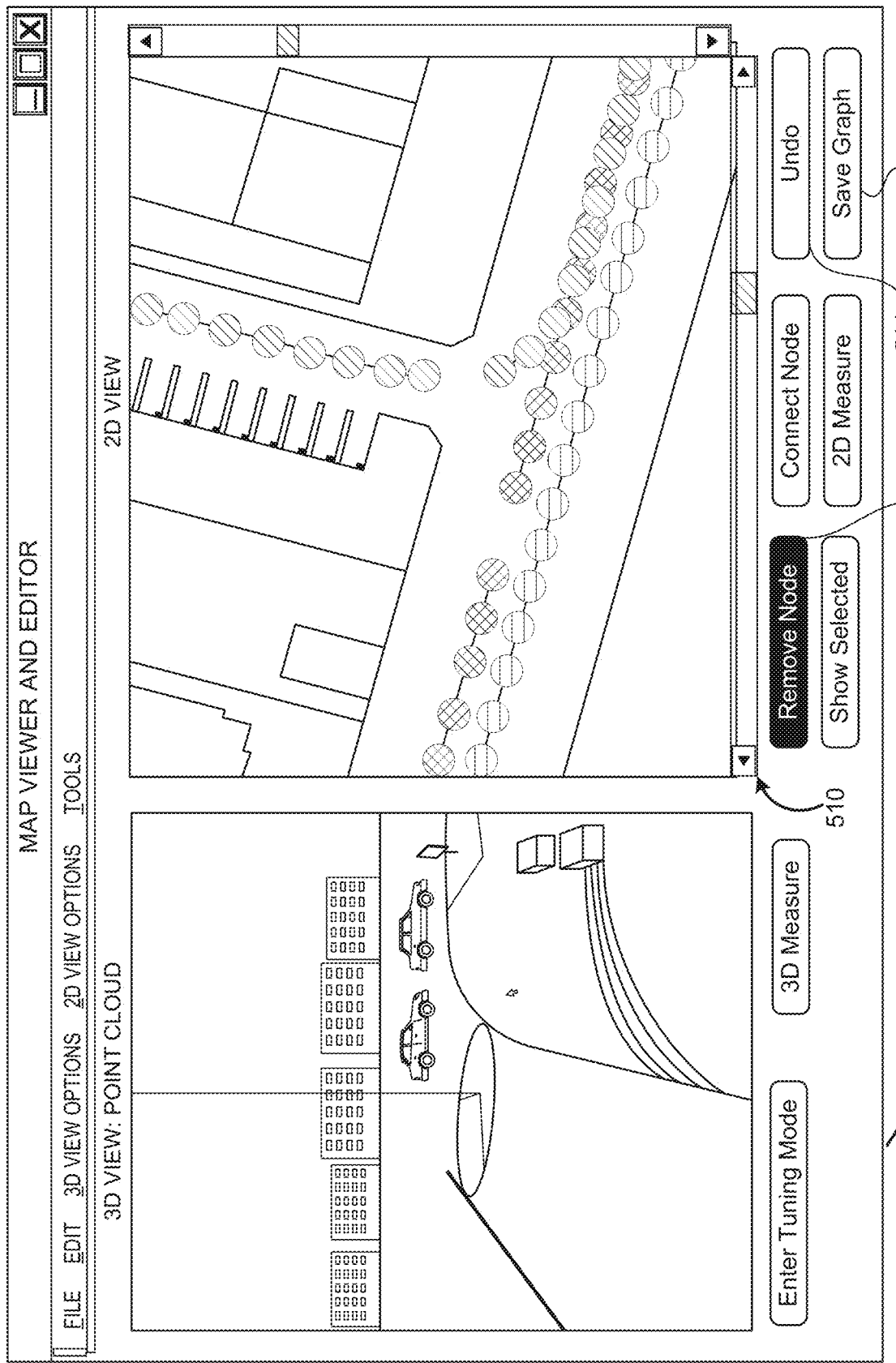
FIG. 5 is an illustrative user interface that includes a 3D point cloud rendering and a 2D map projection in which two user-selected nodes have been removed.

FIG. 5 is an illustrative user interface 500 that includes a 3D point cloud rendering and a 2D map projection 510 in which two user-selected nodes have been removed. For example, as mentioned above with respect to FIG. 4, the user may have viewed 3D point cloud data associated with node indicators 414 and 412 discussed above. If instead of determining that these nodes matched each other, the user instead determined that their point cloud data should not be used in generating an HD map, the user may have selected the "remove node" option 512 to delete both nodes. The user may have removed the nodes, for example, if the user determined that the corresponding point cloud data was of poor quality and/or redundant of other point cloud data captured at or near the same location.

The user may select "undo" option 514 if this change was a mistake, or "save graph" option 516 to either remove the two nodes and associated edges from the stored graph, or flag the nodes (and their associated point cloud data) in stored graph data to be ignored when constructing the HD map. In some embodiments, the user may determine to delete a node based on a combination of visual information provided by the 2D representation and the 3D rendering. For example, the 2D projection 510 may indicate that two nodes from different graphs or groups substantially overlap or are at the same position, while the 3D rendering of point cloud data may provide the user with information regarding which redundant node is associated with better quality point cloud data.

Figure 6:
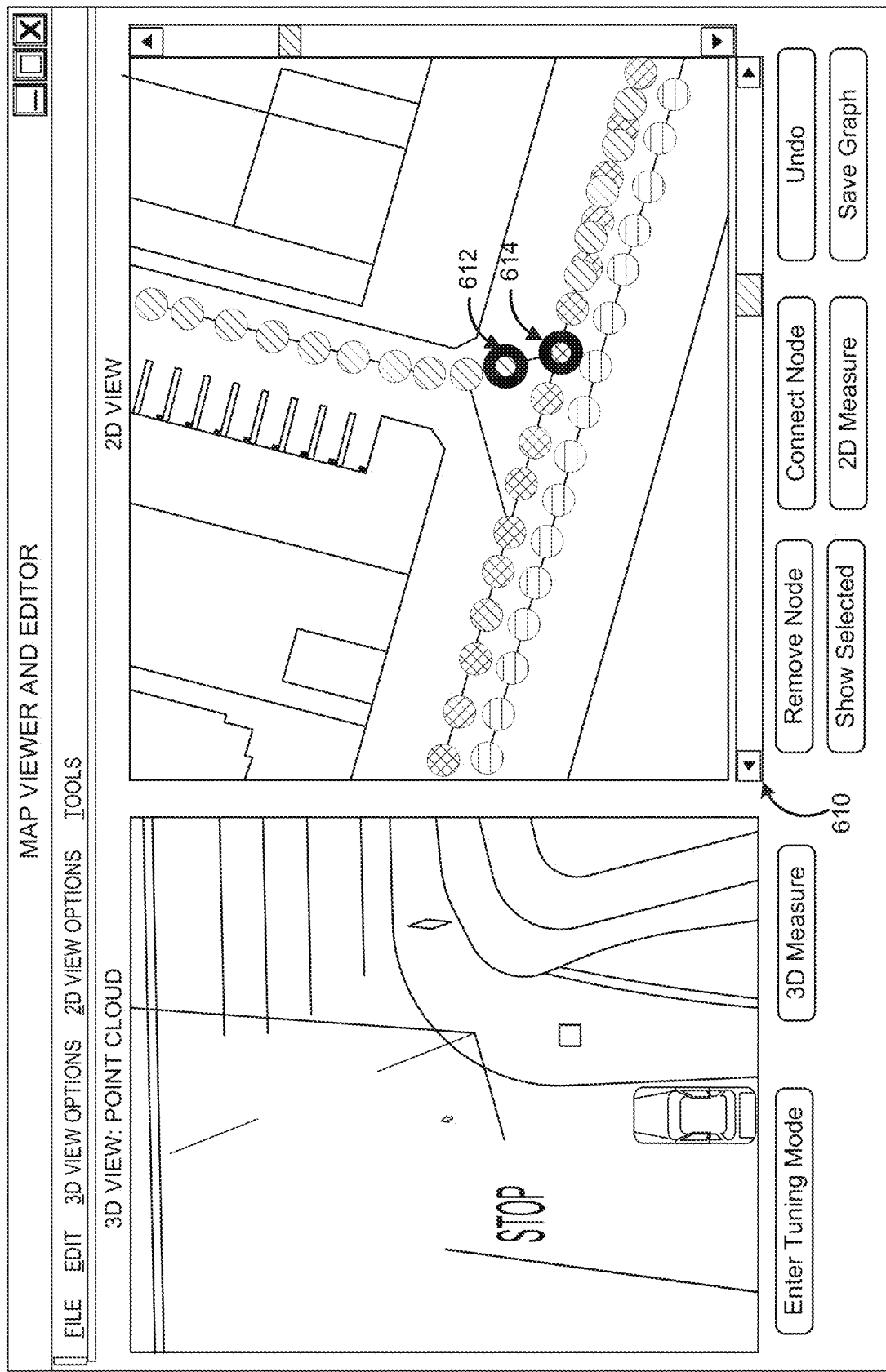
FIG. 6 is an illustrative user interface that includes a 3D point cloud rendering and a zoomed-out view of a 2D map projection, where changes have been made to displayed pose graph data based on user interactions with the user interface.

FIG. 6 is an illustrative user interface 600 that includes a 3D point cloud rendering and a zoomed-out view of a 2D map projection 610, where changes have been made to displayed pose graph data based on user interactions with the user interface. The user has selected to add a connection between the nodes represented by graphical indicators 612 and 614, which are not connected in the earlier-presented user interface 400 of FIG. 4. The user has also removed nodes in this same area in order to remove redundant data and optimize the point cloud data. Based on these changes, the pose graph(s) stored in data store 150 may be altered by the server 130 and/or the map editor device 202 to reflect the node deletions and added edge as selected by the user via the user interface 600. The user may thus have improved the quality and accuracy of the HD map that will be subsequently generated based on the altered pose graph data and how the associated point clouds will be combined during map generation.

Figure 7:
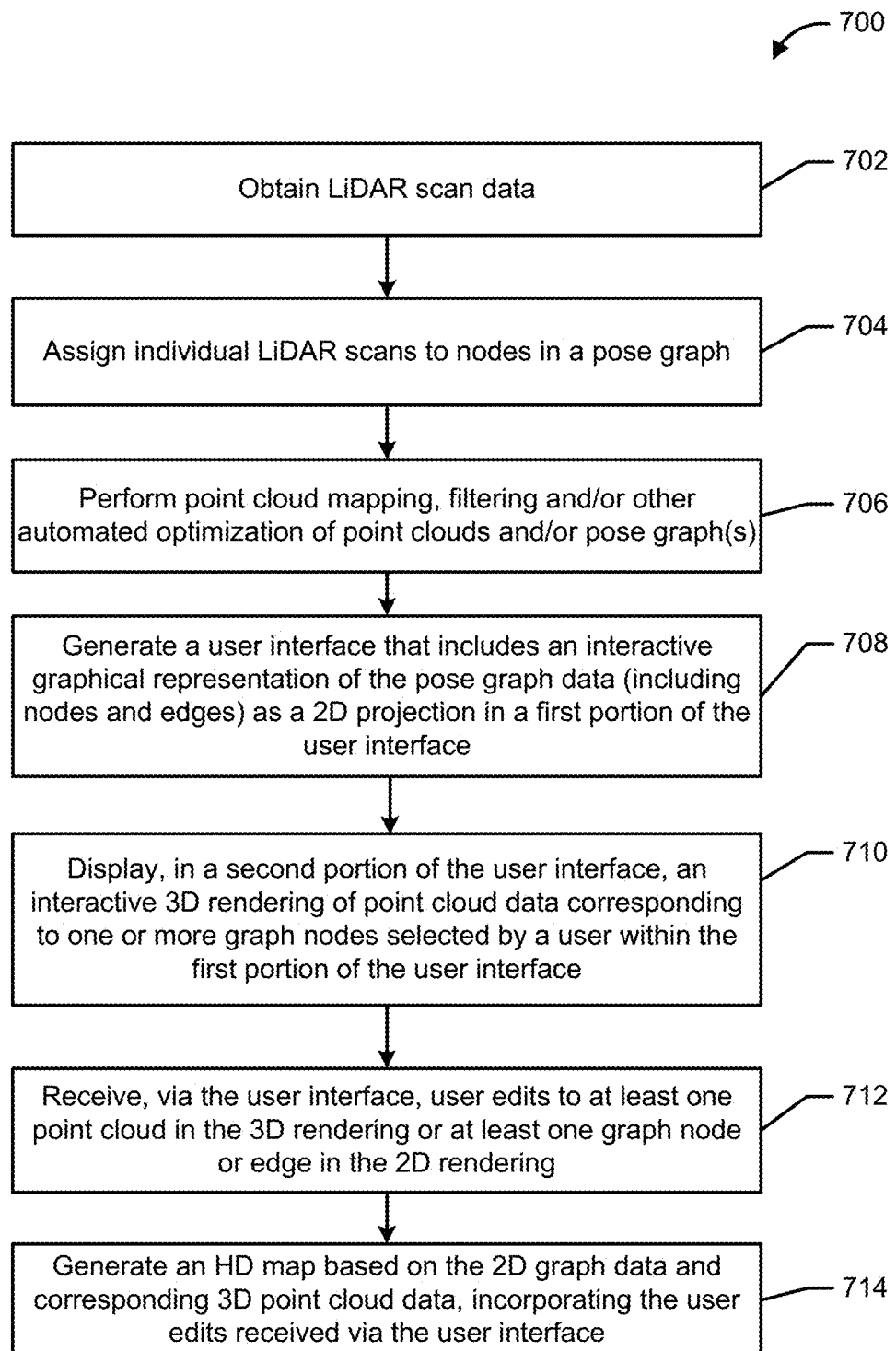
FIG. 7 is a flow diagram of an illustrative method for providing user interface functionality that enables a user to view and edit point cloud and pose graph data for use in generating high definition maps.

FIG. 7 is a flow diagram of an illustrative method 700 for providing user interface functionality that enables a user to view and edit point cloud and pose graph data for use in generating high definition maps. As described above, the map editor device 202 or the server 130 may perform various steps described herein, depending on the embodiment. Accordingly, reference to a system in the description of the flow diagrams of FIGS. 7 and 10 may refer to either the server 130 or map editor device 202, depending on the embodiment. Many details of various blocks of FIG. 7 have been described previously above, and thus will be summarized below to avoid repetition.

At block 702, the system may obtain LiDAR scan data and/or other sensor or camera data that may be used to generate HD maps. For example, as described above, sensor data obtained may include RADAR, infrared camera images, IMU data, etc. The system may then assign individual LiDAR scans and/or other captured data to nodes in a pose graph at block 704. At block 706, the system may then perform point cloud mapping, filtering and/or other automated optimization of point clouds and/or pose graph(s). These pre-processing or intermediate steps in creating HD maps are known in the art and need not be described in detail herein. For example, point cloud matching and pose graph construction may be based in part on the Iterative Closest Point (ICP) algorithm.

At block 708, the system may generate a user interface that includes an interactive graphical representation of the pose graph data (including nodes and edges) as a 2D rendering in a first portion of the user interface. Such a user interface has been described above with respect to, for example, FIG. 4. Next, at block 710, the system may display, in a second portion of the user interface, an interactive 3D rendering of point cloud data corresponding to one or more graph nodes selected by a user within the first portion of the user interface, as has been described with respect to various user interfaces above. At block 712, the system may receive, via the user interface, user edits to at least one point cloud in the 3D rendering or at least one graph node or edge in the 2D rendering, as described above with respect to example user interfaces.

Lastly, at block 714, the system may generate an HD map based on the 2D graph data and corresponding 3D point cloud data, incorporating the user edits received via the user interface(s). Given the intermediate data of pose graphs and point clouds, methods for generation of HD maps therefrom are known in the art and need not be described herein. However, the additional editing and optimization of the intermediate results via user interfaces described herein results in improved HD maps relative to if the prior art methods were used for the final steps of map generation without the improved intermediate edits described herein.

Figure 8:
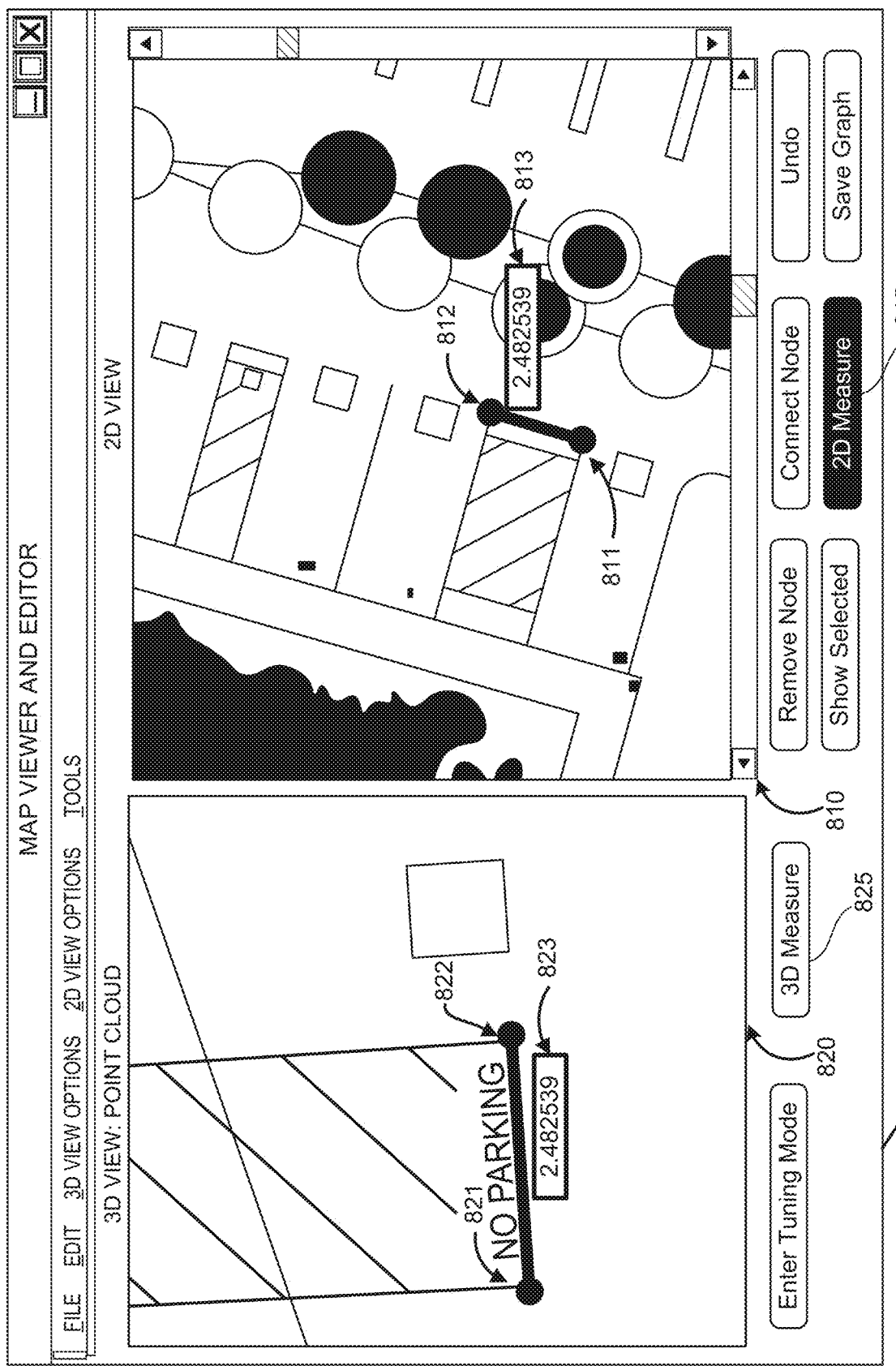
FIG. 8 is an illustrative user interface that includes a 3D point cloud rendering and a zoomed-in view of a 2D map projection, including display of distance measurements between user-selected points.

FIG. 8 is an illustrative user interface 800 that includes a 3D point cloud rendering 820 and a zoomed-in view of a 2D map projection 810, including display of distance measurements between user-selected points. The user may be able to select (e.g., by clicking a mouse using a cursor or touching a touchscreen) any two points within either 2D view 810 or 3D view 820 in order to see a distance measurement between the points. For example, the user could select points 821 and 822 in the 3D view 820, then select "3D measure" option 825 in order to be presented with a measurement 823 of the distance between the two points. This distance may be measured by the computing system (either the map editor device 202 or the server 130) using (x, y, z) coordinates of each point in 3D virtual space. The distance may reflect actual real-world distance between the captured LiDAR data points, and may be in a unit of measurement and/or scale that is customizable by the user. Similarly, the user may make measurements in the 2D view 810, such as selecting points 811 and 812, in order to be presented with measurement 813 after selecting "2D measure" option 815. In some embodiments, corresponding measurements and points may automatically be added to the view (either 2D or 3D) other than the view in which the user selected the points, while in other embodiments the user may independently set different points for measurement in each view. For example, a user could select points 811 and 812 in the 2D view 810 and be presented with the measurement 813. In response to the user selecting points 811 and 812, the 3D view 820 may be automatically updated to show a selection of points 812 and 822 and the measurement 823. The points automatically selected in the view other than the view in which the user selected the points may correspond to the same or nearly the same geographic location as the points selected by the user (e.g., point 821 may be the same geographic location as point 811 and/or point 822 may be the same geographic location as point 812).

Figure 9:
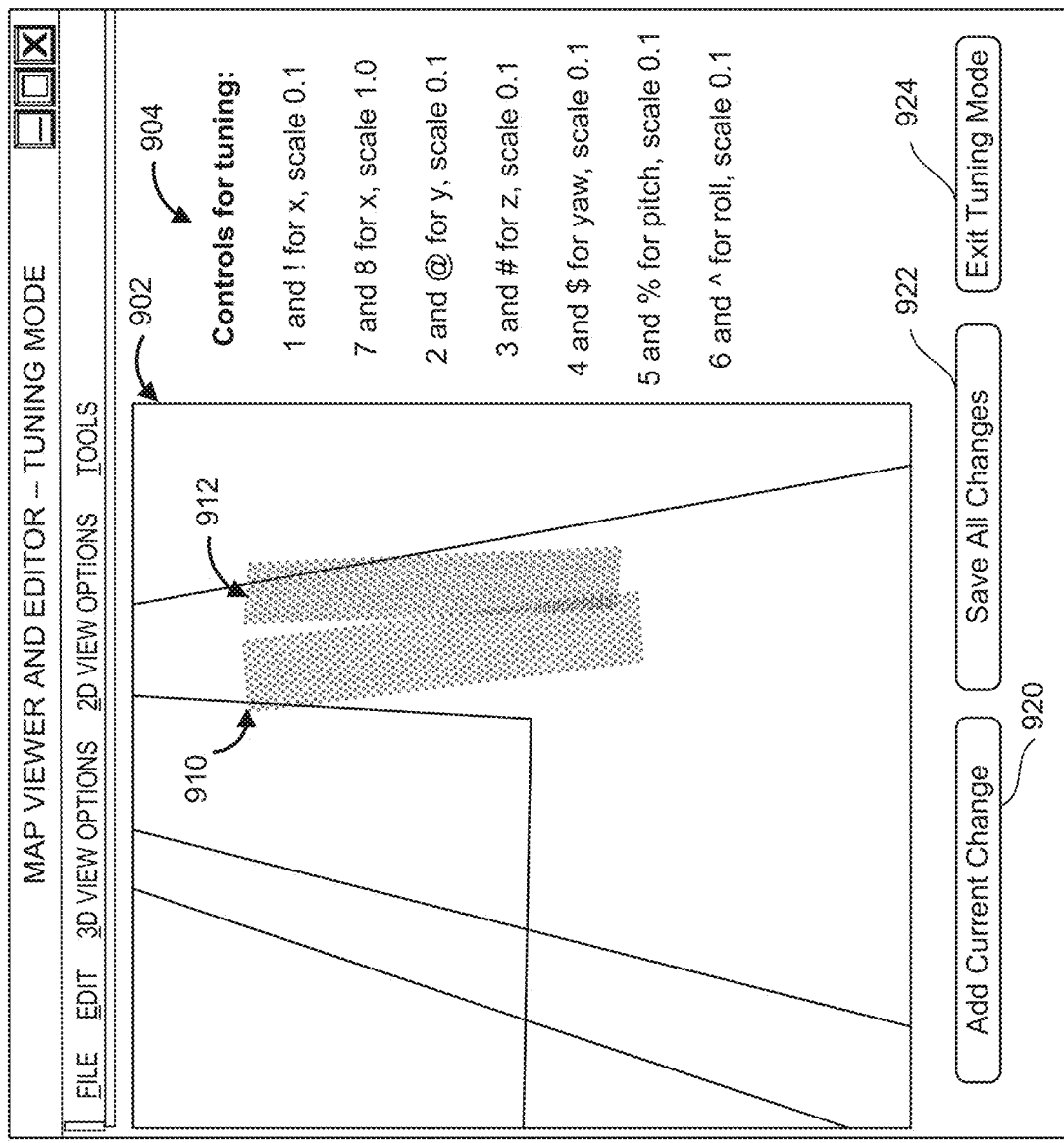
FIG. 9 is an illustrative user interface that includes 3D point cloud rendering of two point clouds and that enables a user to visually re-align or match points in the respective point clouds.

FIG. 9 is an illustrative user interface 900 that includes 3D point cloud rendering 902 of two point clouds 910 and 912, and that enables a user to visually re-align or match points in the respective point clouds. User interface 900 may be considered a "tuning mode" interface that the user may enter by selecting an "enter tuning mode" selectable option in an earlier-presented user interface. In other embodiments, the functionality provided in this tuning mode may be accessible directly in any 3D point cloud rendering view of the earlier-described user interfaces, and may be accessible while a 2D map representation remains in view and capable of interaction within the same user interface as the tuning view.

In some embodiments, the point cloud data 910 and the point cloud data 912 may each represent one or more different LiDAR scans, where the real-world areas captured by the scans at least partially overlap one another. For example, the point clouds 910 and 912 may each be associated with a different neighboring graphical indicator that was selected by the user within a 2D map view for further analysis or editing by the user. Visual information in the 2D view, such as coloring of graphical indicators or shadows present in an area near a node may have signaled to the user that the point clouds may require re-registration, re-alignment, or manual matching. In order to better facilitate visually-assisted point cloud matching, the point cloud data 910 may be presented in one color, while the point cloud data 912 may be presented in a different color (such as a contrasting color). The user may select either of the displayed point cloud sets, then may use the tuning controls 904 to move the selected points or adjust yaw, pitch or roll. As indicated, the tuning options may have varying scales (e.g., a separate option is available for moving points of a point cloud by a scale of 0.1 along the x axis or a scale of 1.0 along the x axis). These relative scales may be adjusted or set by the user, in some embodiments.

While the tuning options 904 are presented as keyboard shortcuts (e.g., the user presses the '1' key to move the selected point cloud left along the x axis by 0.1 or presses the key '!' to move the selected point cloud right along the x axis by 0.1), other input methods may be used in other embodiments. For example, the user may speak commands (e.g., "left by 1," "roll 0.5") or select buttons or other selectable options in the user interface in other embodiments. In some embodiments, the system (e.g., the server 130 and/or the map editor device 202) may automatically generate hints, tips or suggestions regarding how the point clouds should be altered to better match each other, and may either present these suggestions by text or voice, or may automatically make the change visually and request user confirmation. For example, the system may identify two or more point clouds that have edges that are misaligned by less than a threshold distance (e.g., 0.1, 0.5, 1, etc. in the x axis, y axis, and/or z axis) and/or threshold angle (e.g., 1°, 5°, 10°, etc. in the x axis, y axis, and/or z axis). The system can calculate the amount by which one or more of the point clouds should be altered such that the edges are no longer misaligned. As an illustrative example, the system may identify that two edges of the point clouds 910 and 912 are misaligned by less than a threshold distance and/or threshold angle. In response, the system can automatically generate hints, tips or suggestions regarding how the point clouds 910 and 912 should be altered to better match each other. Once the user is finished matching or re-registering the point clouds, the user may select either "add current change" option 920 or "save all changes" option 922. Selection of the save options may cause the new point cloud positioning and orientation relative to each other to be stored in the data store 150 for subsequent use by the server 130 and/or the map editor device 202 in generating an HD map and/or updating an HD map. The user may exit the tuning mode and return to an earlier-presented user interface by selecting option 924.

Figure 10:
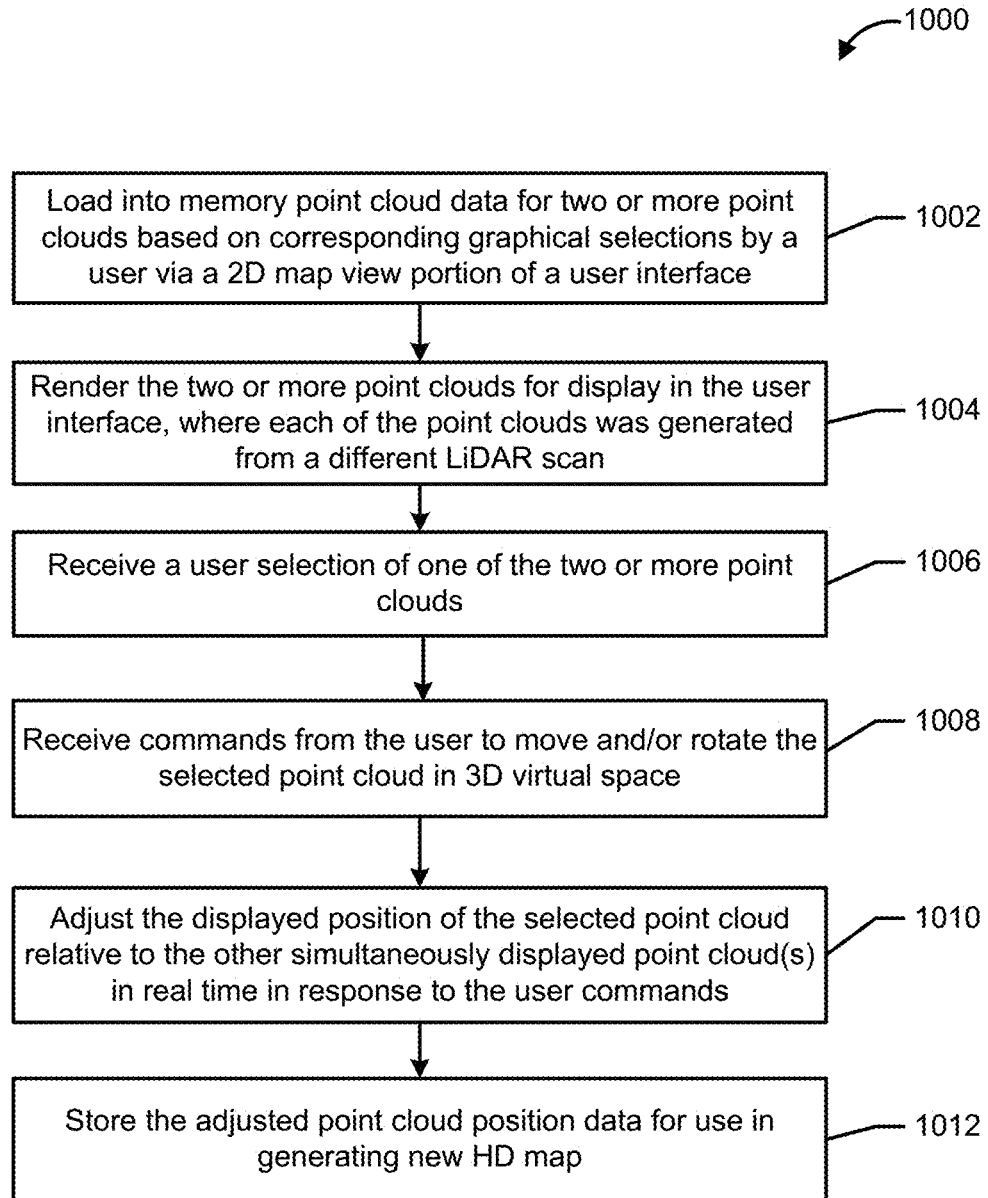
FIG. 10 is a flow diagram of an illustrative method for enabling a user to visually edit positioning of one or more point clouds for use in generating a high definition map.

FIG. 10 is a flow diagram of an illustrative method 1000 for enabling a user to visually edit positioning of one or more point clouds for use in generating a high definition map, which may be considered a manual or semi-manual matching process of two sets of point cloud data via an interactive user interface. Given that details of various blocks of FIG. 10 have been described above, some steps will be summarized below to avoid repetition. At block 1002, the system may load point cloud data for two or more point clouds based on corresponding graphical selections by a user via a 2D map view portion of a user interface (similar to user interface descriptions above). In some embodiments, the point cloud data may be retrieved from data store 150 and loaded into RAM of the server or map editor device, depending on the embodiment, in order for the system to render the point cloud data in 3D virtual space.

The system may render the two or more point clouds for display in the user interface at block 1004, where each of the point clouds may be generated from a different LIDAR scan (or different sets of LiDAR scans). For example, the point clouds may have been captured at different times, captured by different sensors, or resulted from applying different filtering or pre-processing to the respective LiDAR data. At block 1006, the system may receive a user selection of one of the two or more point clouds that the user wishes to manipulate (such as to move or rotate to better match the other displayed point cloud data).

Next, at block 1008, the system may receive one or more commands from the user to move and/or rotate the selected point cloud in 3D virtual space, as described above with respect to FIG. 9. At block 1010, the system may then adjust the displayed position of the selected point cloud relative to the other simultaneously displayed point cloud(s) in real time in response to the user commands. At block 1012, which may be in response to a user selection (as described above), the system may store the adjusted point cloud position data for use in generating a new HD map, such as replacing previously stored data in data store 150.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation. For example, it will be appreciated that operations described as involving cooperation or communication between the server 130 and the map editor device 202 may, in other embodiments, be implemented entirely by a single computing device (such as only the server 130 in communication with a display and user input devices, or only the map editor device 202 executing locally stored executable instructions of an application operating on the map editor device).

Example Embodiments

Some example enumerated embodiments of the present invention are recited in this section in the form of methods, systems, and non-transitory computer-readable media, without limitation.

In one embodiment, a computer-implemented method described above includes obtaining point cloud data generated from a plurality of light detection and ranging (LIDAR) scans captured along a plurality of roads, then grouping the point cloud data to form a plurality of point cloud groups, the plurality of point cloud groups including at least (a) a first group of point cloud data captured in a first geographic area by LiDAR during a first time period and (b) a second group of point cloud data captured in the first geographic area by LiDAR during a second time period, wherein at least a first portion of the first group of point cloud data intersects in three-dimensional (3D) space with at least a second portion of the second group of point cloud data. The method may further include generating a user interface for display, wherein the user interface comprises a two-dimensional (2D) map representation of at least a portion of the first geographic area, wherein the 2D map representation is generated as a projection of at least a subset of the point cloud data. The method may then include overlaying, within the 2D map representation within the user interface, a first graphical indicator and a second graphical indicator, wherein the first graphical indicator indicates a first position within the 2D map representation of the first group of point cloud data, and wherein the second graphical indicator indicates a second position within the 2D map representation of the second group of point cloud data, and receiving a zoom-in request via the user interface. In response to the zoom-in request, the method may include updating display of the 2D map representation to include additional graphical overlay data, wherein the graphical overlay data includes a plurality of node indicators and corresponding connections between individual node indicators, wherein the plurality of node indicators include (a) a first set of node indicators representing nodes in a first pose graph associated with the first group of point cloud data and (b) a second set of node indicators representing nodes in a second pose graph associated with the second group of point cloud data, then receiving, via the user interface, a user selection of at least one node indicator in the first set of node indicators, wherein the at least one node indicator represents at least a first node in the first pose graph. The method may further include generating for display, within a different portion of the user interface than the 2D map representation, a 3D point cloud rendering of point cloud data represented by the at least one node indicator, and presenting selectable options within the user interface for manipulating at least the first pose graph, wherein the selectable options include (1) a first option to remove the first node from the first pose graph and (2) a second option for making an edit to one or more connections of the at least one node indicator, wherein the edit comprises at least one of deleting a connection or adding a connection between the at least one node indicator and a different node indicator in the first or second sets of node indicators. The method may include generating altered pose graph data of at least one of the first pose graph or the second pose graph based on a user selection of at least one of the first option or the second option, and generating a high definition map based on the altered pose graph data and the point cloud data.

The computer-implement method above may further include storing the high definition map in an electronic data store, and sending the high definition map over a network to a plurality of vehicles for use in navigation by one or more of the plurality of vehicles. The first graphical indicator and the first set of node indicators may be displayed in a first color, wherein the second graphical indicator and the second set of node indicators are displayed in a second color, and wherein the first color is different than the second color.

According to another embodiment, a computer system may include a memory, and a hardware processor in communication with the memory and configured with processor-executable instructions to perform specific operations. The operations may include obtaining point cloud data generated from a plurality of light detection and ranging (LiDAR) scans of a geographic area, then generating a user interface for display, wherein the user interface comprises a two-dimensional (2D) map representation of at least a portion of the geographic area. The operations may further include overlaying, within the 2D map representation within the user interface, graphical overlay data, wherein the graphical overlay data includes a plurality of node indicators and corresponding connections between individual node indicators, wherein the plurality of node indicators include (a) a first set of node indicators representing nodes in a first pose graph associated with a first group of point cloud data and (b) a second set of node indicators representing nodes in a second pose graph associated with a second group of point cloud data, and receiving, via the user interface, a user selection of at least one node indicator in the first set of node indicators, wherein the at least one node indicator represents at least a first node in the first pose graph. The operations may further include, in response to the user selection, generating for display, within a different portion of the user interface than the 2D map representation, a 3D point cloud rendering of point cloud data represented by the at least one node indicator. The operations may further include presenting selectable options within the user interface for manipulating at least the first pose graph, wherein the selectable options include (1) a first option to remove the first node from the first pose graph and (2) a second option for making an edit to one or more connections of the at least one node indicator, wherein the edit comprises at least one of deleting a connection or adding a connection between the at least one node indicator and a different node indicator in the first or second sets of node indicators. The operations may further include generating altered pose graph data of at least one of the first pose graph or the second pose graph based on a user selection of at least one of the first option or the second option, and generating a high definition map based on the altered pose graph data and the point cloud data.

The operations of the computer system above may further include generating for display, within the different portion of the user interface than the 2D map representation and while the 3D point cloud rendering of point cloud data represented by the at least one node indicator is displayed, a second 3D point cloud rendering of point cloud data represented by a second node indicator selected by the user within the 2D map representation, wherein the second node indicator is in the second set of node indicators.

In one embodiment, the 3D point cloud rendering of point cloud data represented by the at least one node indicator is displayed in a different color than the second 3D point cloud rendering. In another embodiment, each individual node indicator in the first set of node indicators represents multiple LiDAR scans captured in proximity of each other. In another embodiment, the user selection is of the first option, and generating the altered pose graph data comprises removing one or more point clouds associated with the at least one node indicator from consideration by the computer system when generating the high definition map. In another embodiment, the user selection is of the second option, and generating the altered pose graph data comprises adding a connection between the at least one node indicator from the first pose graph and a node indicator from the second pose graph. In another embodiment, the 2D map representation is generated as a projection of at least a subset of the point cloud data.

In another embodiment of the above computer system, the user interface further provides measurement functionality enabling a user to select any two points within the 2D map representation, and selection of two points using the measurement functionality results in the computer system causing display of a line between the two points and an automatically calculated distance measurement between the two points. In another embodiment, the operations further comprise automatically updating the 3D point cloud rendering in the user interface to mark a second line within the 3D point cloud rendering at a position in 3D virtual space that corresponds to a position of the line displayed in the 2D map representation. In another embodiment, the initial connections between individual node indicators are based at least in part on confidence scores generated by the computer system during a point cloud matching process performed prior to generating the user interface for display. In another embodiment, the point cloud matching process comprises application of an Iterative Closest Point (ICP) algorithm.

According to another embodiment, a non-transitory computer readable medium stores computer executable instructions that, when executed by one or more computer systems, configure the one or more computer systems to perform specific operations. The operations may include generating a user interface for display, wherein the user interface comprises a two-dimensional (2D) map representation of at least a portion of a geographic area, and presenting, within the 2D map representation within the user interface, graphical data that includes a plurality of node indicators and corresponding connections between individual node indicators, wherein the plurality of node indicators include (a) a first set of node indicators representing nodes in a first pose graph associated with a first group of point cloud data and (b) a second set of node indicators representing nodes in a second pose graph associated with a second group of point cloud data. The operations may further include receiving, via the user interface, a user selection of at least one node indicator in the first set of node indicators, wherein the at least one node indicator represents at least a first node in the first pose graph, and in response to the user selection, generating for display, within the user interface, a 3D point cloud rendering of point cloud data represented by the at least one node indicator. The operations may further include presenting selectable options within the user interface for manipulating at least the first pose graph, wherein the selectable options include (1) a first option to remove the first node from the first pose graph and (2) a second option for making an edit to one or more connections of the at least one node indicator, wherein the edit comprises at least one of deleting a connection or adding a connection between the at least one node indicator and a different node indicator in the first or second sets of node indicators, then generating altered pose graph data of at least one of the first pose graph or the second pose graph based on a user selection of at least one of the first option or the second option. The operations may further include generating a high definition map based on the altered pose graph data and the point cloud data.

According to one embodiment, with reference to the above non-transitory computer readable medium, the first set of node indicators are displayed in a different color than the second set of node indicators to visually indicate a respective pose graph of each individual node indicator. In another embodiment, each individual node indicator in the first set of node indicators and the second set of node indicators represents multiple LiDAR scans captured in proximity of each other. In another embodiment, when the user selection is of the first option, generating the altered pose graph data comprises removing one or more point clouds associated with the at least one node indicator from consideration by a computer system when generating the high definition map. In another embodiment, when the user selection is of the second option, generating the altered pose graph data comprises adding a connection between the at least one node indicator from the first pose graph and a node indicator from the second pose graph. In another embodiment, the user interface further provides measurement functionality enabling a user to select any two points within the 2D map representation or the 3D point cloud rendering, and selection of two points using the measurement functionality results in the computing system causing display of a line between the two points and an automatically calculated distance measurement between the two points.

According to one embodiment, a computer-implemented method described herein includes obtaining point cloud data created based at least in part on a plurality of light detection and ranging (LiDAR) scans of a geographic area, and generating a user interface for display, wherein the user interface comprises a two-dimensional (2D) map representation of at least a portion of the geographic area, wherein the 2D map representation is generated as a projection of at least a subset of the point cloud data, wherein the user interface includes a plurality of graphical indicators overlaid within the 2D map representation, and wherein each of the graphical indicators represents a different set of one or more LiDAR scans. The method further includes receiving, via user interaction with the user interface, user selection of at least a first graphical indicator and a second graphical indicator of the plurality of graphical indicators, wherein the first graphical indicator represents a first set of point cloud data and the second graphical indicator represents a second set of point cloud data, wherein the first set of point cloud data partially intersects in three-dimensional (3D) space with at least a portion of the second set of point cloud data. The method further includes generating a 3D rendering of the first and second sets of point cloud data, wherein relative display positions of the first set of point cloud data and the second set of point cloud data in the 3D rendering visually convey a partial intersection between a first subset of points of the first set of point cloud data and a second subset of points of the second set of point cloud data, wherein the first subset of points are not perfectly aligned with the second subset of points, and updating the user interface to include display of the 3D rendering, wherein the first set of point cloud data is displayed in a first color and the second set of point cloud data is displayed in a second color, wherein the first color is different than the second color. The method further includes displaying, within the user interface, a plurality of suggested commands for altering positioning of the first set of point cloud data in 3D virtual space in order to better match at least the first subset of points with the second subset of points, and receiving one or more user commands to edit positioning of at least the first set of point cloud data in the 3D virtual space, wherein the one or more user commands comprise at least one of a command to move the first set of point cloud data or a command to rotate the first set of point cloud data relative to the second set of point cloud data. The method further includes updating display of at least the first set of point cloud data relative to the second set of point cloud data in real time in response to the one or more user commands, and receiving an indication, via the user interface, to update stored point cloud data to reflect the one or more user commands. The method then may include storing adjusted point cloud data for at least the first set of point cloud data based on the one or more user commands, and generating a high definition map of the geographic area, wherein the high definition map is generated based at least in part on the adjusted point cloud data and other point cloud data from the plurality of LiDAR scans.

The computer-implemented method above may further include, according to another embodiment, storing the high definition map in an electronic data store, and sending the high definition map over a network to a plurality of vehicles for use in navigation by one or more of the plurality of vehicles. According to another embodiment, the 3D rendering is presented in the user interface while the 2D map representation of the geographic area remains displayed in the user interface, wherein the 3D rendering is presented in a different portion of the user interface than the 2D map representation. According to another embodiment, the method may further include receiving, via user interaction with the 2D map representation, selection of a third graphical indicator of the plurality of graphical indicators, and updating display of the 3D rendering within the user interface to include rendering of a third set of point cloud data associated with the third graphical indicator.

According to another embodiment, a computer system may include a memory, and a hardware processor in communication with the memory and configured with processor-executable instructions to perform specific operations. The operations may include obtaining a first set of point cloud data and a second set of point cloud data, wherein the first and second sets of point cloud data are each based at least in part on a plurality of light detection and ranging (LiDAR) scans of a geographic area, and generating a three-dimensional (3D) rendering of the first set of point cloud data and the second set of point cloud data, wherein relative display positions of the first set of point cloud data and the second set of point cloud data in the 3D rendering visually convey a partial intersection between a first subset of points of the first set of point cloud data and a second subset of points of the second set of point cloud data, wherein the first subset of points are not perfectly aligned with the second subset of points. The operations may further include presenting a user interface for display, wherein the user interface includes display of the 3D rendering, and displaying, within the user interface, a plurality of suggested commands for altering positioning of the first set of point cloud data in 3D virtual space in order to better match at least the first subset of points with the second subset of points. The operations may further include receiving one or more user commands to edit positioning of at least the first set of point cloud data in the 3D virtual space, wherein the one or more user commands comprise at least one of a command to move the first set of point cloud data or a command to rotate the first set of point cloud data relative to the second set of point cloud data, and updating, within the user interface, display of at least the first set of point cloud data relative to the second set of point cloud data in real time in response to the one or more user commands. The operations may further include receiving an indication, via the user interface, to update stored point cloud data to reflect the one or more user commands, and storing, in an electronic data store, adjusted point cloud data for at least the first set of point cloud data based on the one or more user commands.

In another embodiment of the computer system above, the first set of point cloud data is displayed in a first color and the second set of point cloud data is displayed in a second color, wherein the first color is different than the second color. In one embodiment, the first set of point cloud data is generated from a plurality of LiDAR scans captured in proximity of each other. In one embodiment, the operations further comprise providing options, via the user interface, to select a command and an associated scale for the command, wherein the scale represents a numeric amount of at least one of: movement, yaw, pitch or roll. In another embodiment, the suggested commands include movement along each of an x axis, y axis and z axis. In another embodiment, each of the suggested commands is presented along with indication of an associated keyboard shortcut.

In another embodiment of the above computer system, the one or more user commands are received based on one or more keys entered by the user, and updates to the display in response to the one or more user commands are based in part on a predefined mapping of keys to commands. In another embodiment, the operations further comprise automatically determining a suggested spatial manipulation of the first set of point cloud data to better match at least the first subset of points with the second subset of points. In another embodiment, the operations further comprise automatically applying the suggested spatial manipulation within the 3D rendering displayed in the user interface, and prompting for user approval of the suggested spatial manipulation. In a further embodiment, the suggested spatial manipulation is determined based at least in part on a determination that the first set of point cloud data and the second set of point cloud data are misaligned by less than a threshold, wherein the threshold represents at least one of a distance or an angle.

According to another embodiment, a non-transitory computer readable medium stores computer executable instructions that, when executed by one or more computer systems, configure the one or more computer systems to perform specific operations. The operations may include obtaining a first set of point cloud data and a second set of point cloud data, wherein the first and second sets of point cloud data are each based at least in part on a plurality of light detection and ranging (LiDAR) scans of a geographic area, and generating a three-dimensional (3D) rendering of the first set of point cloud data and the second set of point cloud data, wherein a first subset of points of the first set of point cloud data at least partially intersect a second subset of points of the second set of point cloud data in the 3D rendering, and the first subset of points are not perfectly aligned with the second subset of points. The operations may further include presenting a user interface for display, wherein the user interface includes display of the 3D rendering, and presenting a plurality of options for altering positioning of the first set of point cloud data in 3D virtual space in order to better match at least the first subset of points with the second subset of points. The operations may further include receiving one or more user commands to edit positioning of at least the first set of point cloud data in the 3D virtual space, wherein the one or more user commands comprise at least one of a command to move the first set of point cloud data or a command to rotate the first set of point cloud data, and updating, within the user interface, display of at least the first set of point cloud data relative to the second set of point cloud data in real time in response to the one or more user commands. The operations may further include storing, in an electronic data store, adjusted point cloud data for at least the first set of point cloud data based on the one or more user commands.

According to one embodiment, with reference to the above non-transitory computer readable medium, the plurality of options include commands and an associated scale for each command, wherein the scale represents a numeric amount of at least one of: movement, yaw, pitch or roll. In another embodiment, the one or more user commands are received based on one or more keys entered by the user, and updates to the display in response to the one or more user commands are based in part on a predefined mapping of keys to commands. In another embodiment, the operations further comprise automatically determining a suggested spatial manipulation of the first set of point cloud data to better match at least the first subset of points with the second subset of points. In another embodiment, the operations comprise automatically applying the suggested spatial manipulation within the 3D rendering displayed in the user interface. In another embodiment, the suggested spatial manipulation is determined based at least in part on a determination that the first set of point cloud data and the second set of point cloud data are misaligned by less than a threshold, where the threshold represents at least one of a distance or an angle.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:

obtaining point cloud data generated from a plurality of light detection and ranging (LiDAR) scans captured along a plurality of roads;

processing the point cloud data using an iterative closest point (ICP) algorithm to form a plurality of point cloud groups associated with initial pose graph data, the plurality of point cloud groups including at least (a) a first group of point cloud data captured in a first geographic area by LiDAR during a first time period and (b) a second group of point cloud data captured in the first geographic area by LiDAR during a second time period, wherein at least a first portion of the first group of point cloud data intersects in three-dimensional (3D) space with at least a second portion of the second group of point cloud data;

generating a user interface for display, wherein the user interface comprises a two-dimensional (2D) map representation of at least a portion of the first geographic area, wherein the user interface further includes a plurality of node indicators and corresponding connections between individual node indicators, wherein the plurality of node indicators include (a) a first set of node indicators representing nodes in a first pose graph associated with the first group of point cloud data and (b) a second set of node indicators representing nodes in a second pose graph associated with the second group of point cloud data;

receiving, via the user interface, a user selection of at least one node indicator in the first set of node indicators, wherein the at least one node indicator represents at least a first node in the first pose graph;

presenting selectable options within the user interface for manipulating at least the first pose graph, wherein the selectable options include at least one of (1) a first option to remove the first node from the first pose graph or (2) a second option for making an edit to one or more connections of the at least one node indicator, wherein the edit comprises at least one of deleting a connection or adding a connection between the at least one node indicator and a different node indicator in the first or second sets of node indicators;

generating altered pose graph data that includes a change, relative to the initial pose graph data, to at least one of the first pose graph or the second pose graph based on a user selection of at least one of the first option or the second option; and generating a high definition map based on the altered pose graph data and the point cloud data.

2. The computer-implemented method of claim 1, further comprising:
storing the high definition map in an electronic data store; and
sending the high definition map over a network to a plurality of vehicles for use in navigation by one or more of the plurality of vehicles.

3. The computer-implemented method of claim 1, wherein the first set of node indicators are displayed in a first color, wherein the second set of node indicators are displayed in a second color, and wherein the first color is different than the second color.

4. The computer-implemented method of claim 1, wherein the user selection is of the second option, wherein the edit comprises deleting a connection between a node indicator in the first set of node indicators and a different node indicator in the second set of node indicators, wherein the user selection causes first point cloud data represented by the node indicator and second point cloud data represented by the different node indicator to no longer be considered neighboring point cloud groups in the generating of the high definition map.

5. A computer system comprising:
memory; and
a hardware processor in communication with the memory and configured with processor-executable instructions to perform operations comprising:
obtaining point cloud data generated from a plurality of light detection and ranging (LiDAR) scans of a geographic area;
processing the point cloud data using an iterative closest point (ICP) algorithm to form a plurality of node indicators;
generating a user interface for display, wherein the user interface comprises a two-dimensional (2D) map representation of at least a portion of the geographic area, wherein the user interface further includes the plurality of node indicators and corresponding connections between individual node indicators, wherein the plurality of node indicators include (a) a first set of node indicators representing nodes in a first pose graph associated with a first group of point cloud data and (b) a second set of node indicators representing nodes in a second pose graph associated with a second group of point cloud data;
receiving, via the user interface, a user selection of at least one node indicator in the first set of node indicators, wherein the at least one node indicator represents at least a first node in the first pose graph;
presenting selectable options within the user interface for manipulating at least the first pose graph, wherein the selectable options include at least one of (1) a first option to remove the first node from the first pose graph or (2) a second option for making an edit to one or more connections of the at least one node indicator, wherein the edit comprises at least one of deleting a connection or adding a connection between the at least one node indicator and a different node indicator in the first or second sets of node indicators;
generating altered pose graph data of at least one of the first pose graph or the second pose graph based on a user selection of at least one of the first option or the second option; and
generating a high definition map based on the altered pose graph data and the point cloud data.

6. The computer system of claim 5, wherein the selectable options presented within the user interface include the first option and the second option.

7. The computer system of claim 5, wherein each individual node indicator in the first set of node indicators represents multiple LiDAR scans captured in proximity of each other.

8. The computer system of claim 5, wherein the user selection is of the first option, and wherein generating the altered pose graph data comprises removing one or more point clouds associated with the at least one node indicator from consideration by the computer system when generating the high definition map.

9. The computer system of claim 5, wherein the user selection is of the second option, and wherein generating the altered pose graph data comprises adding a connection between the at least one node indicator from the first pose graph and a node indicator from the second pose graph.

10. The computer system of claim 5, wherein the 2D map representation is generated as a projection of at least a subset of the point cloud data.

11. The computer system of claim 5, wherein the user interface further provides measurement functionality enabling a user to select any two points within the 2D map representation, wherein selection of two points using the measurement functionality results in the computer system causing display of a line between the two points and an automatically calculated distance measurement between the two points.

12. The computer system of claim 5, wherein the user selection is of the second option, wherein the edit comprises deleting a connection between a node indicator in the first set of node indicators and a different node indicator in the second set of node indicators, wherein the user selection causes first point cloud data represented by the node indicator and second point cloud data represented by the different node indicator to no longer be considered neighboring point cloud groups in the generating of the high definition map.

13. The computer system of claim 5, wherein initial connections between individual node indicators are based at least in part on confidence scores generated by the computer system during a point cloud matching process performed prior to generating the user interface for display.

14. The computer system of claim 13, wherein the point cloud matching process comprises application of the ICP algorithm.

15. A non-transitory computer readable medium storing computer executable instructions that, when executed by one or more computer systems, configure the one or more computer systems to perform operations comprising:
processing point cloud data generated from a plurality of light detection and ranging (LiDAR) scans of a geographic area using an iterative closest point (ICP) algorithm to form a plurality of node indicators;
generating a user interface for display, wherein the user interface comprises a two-dimensional (2D) map representation of at least a portion of the geographic area;
presenting, within the 2D map representation within the user interface, graphical data that includes the plurality of node indicators and corresponding connections between individual node indicators, wherein the plurality of node indicators include (a) a first set of node indicators representing nodes in a first pose graph associated with a first group of point cloud data and (b)

a second set of node indicators representing nodes in a second pose graph associated with a second group of point cloud data;

receiving, via the user interface, a user selection of at least one node indicator in the first set of node indicators, wherein the at least one node indicator represents at least a first node in the first pose graph;

presenting selectable options within the user interface for manipulating at least the first pose graph, wherein the selectable options include at least one of (1) a first option to remove the first node from the first pose graph or (2) a second option for making an edit to one or more connections of the at least one node indicator, wherein the edit comprises at least one of deleting a connection or adding a connection between the at least one node indicator and a different node indicator in the first or second sets of node indicators;

generating altered pose graph data of at least one of the first pose graph or the second pose graph based on a user selection of at least one of the first option or the second option; and generating a high definition map based on the altered pose graph data and the point cloud data.

16. The non-transitory computer readable medium of claim 15, wherein the first set of node indicators are displayed in a different color than the second set of node indicators to visually indicate a respective pose graph of each individual node indicator.

17. The non-transitory computer readable medium of claim 15, wherein each individual node indicator in the first set of node indicators and the second set of node indicators represents multiple LiDAR scans captured in proximity of each other.

18. The non-transitory computer readable medium of claim 15, wherein the user selection is of the first option, and wherein generating the altered pose graph data comprises removing one or more point clouds associated with the at least one node indicator from consideration by a computer system when generating the high definition map.

19. The non-transitory computer readable medium of claim 15, wherein the user selection is of the second option, and wherein generating the altered pose graph data comprises adding a connection between the at least one node indicator from the first pose graph and a node indicator from the second pose graph.

20. The non-transitory computer readable medium of claim 15, wherein the user interface further provides measurement functionality enabling a user to select any two points within the 2D map representation, wherein selection of two points using the measurement functionality results in the computing system causing display of a line between the two points and an automatically calculated distance measurement between the two points.

* * * * *